US012608714B2

(12) United States Patent
Kennedy et al.

(10) Patent No.: US 12,608,714 B2
(45) Date of Patent: Apr. 21, 2026

(54) DATA MODEL FOR OMNICHANNEL CUSTOMER INTERACTIONS

(71) Applicant: Twilio Inc., San Francisco, CA (US)

(72) Inventors: Ryan Kennedy, San Francisco, CA (US); Charlie Helin, Murrieta, CA (US); Dipesh Chauhan, San Francisco, CA (US); Ajey Shah, San Francisco, CA (US); Aymen Naim, Walnut Creek, CA (US)

(73) Assignee: Twilio Inc., San Francisco, CA (US)

( * ) Notice: Subject to any disclaimer, the term of this patent is extended or adjusted under 35 U.S.C. 154(b) by 338 days.

(21) Appl. No.: 18/198,734

(22) Filed: May 17, 2023

(65) Prior Publication Data

US 2024/0386435 A1 Nov. 21, 2024

(51) Int. Cl.
*G06Q 30/015* (2023.01)
*H04L 51/046* (2022.01)

(52) U.S. Cl.
CPC ......... *G06Q 30/015* (2023.01); *H04L 51/046* (2013.01)

(58) Field of Classification Search
CPC ............................ G06F 16/245; G06Q 30/015
See application file for complete search history.

(56) References Cited

U.S. PATENT DOCUMENTS

| | | | |
|---|---|---|---|
| 9,762,733 B1 | 9/2017 | Ramanujaiaha et al. | |
| 11,489,963 B1 * | 11/2022 | Myers .................. | H04M 3/5175 |
| 2002/0008626 A1 * | 1/2002 | Waters ............... | G06Q 30/0261 340/573.1 |

| | | | |
|---|---|---|---|
| 2019/0288965 A1 * | 9/2019 | Qiu ....................... | H04L 51/046 |
| 2020/0099788 A1 | 3/2020 | De Abreu Resenes et al. | |
| 2020/0296431 A1 * | 9/2020 | Sodagar .................. | G06F 9/546 |
| 2020/0371503 A1 * | 11/2020 | Falde .................... | B23K 31/125 |
| 2021/0051196 A1 * | 2/2021 | Hodgins ............. | H04L 67/1044 |
| 2021/0165617 A1 * | 6/2021 | Adachi ................. | G06F 21/608 |
| 2022/0270024 A1 * | 8/2022 | Miller .................. | G06Q 10/103 |
| 2022/0366460 A1 * | 11/2022 | Hobart .............. | G06Q 30/0281 |
| 2023/0097696 A1 * | 3/2023 | Watanabe ........... | G06Q 10/101 705/300 |

FOREIGN PATENT DOCUMENTS

| | | |
|---|---|---|
| WO | 2014089539 | 6/2014 |
| WO | 2024238770 | 11/2024 |

OTHER PUBLICATIONS

"International Application Serial No. PCT US2024 029657, International Search Report mailed Jul. 12, 2024", 3 pgs.
"International Application Serial No. PCT US2024 029657, Written Opinion mailed Jul. 12, 2024", 7 pgs.

* cited by examiner

*Primary Examiner* — Tarek Chbouki
(74) *Attorney, Agent, or Firm* — Schwegman Lundberg & Woessner, P.A.

(57) ABSTRACT

Described herein is a cloud-based omnichannel customer interaction service, also referred to as a contact center service, that deploys an improved data model for capturing customer interaction data. From the data model, a database schema is instantiated to include a set of related database tables. The arrangement and relationship of the data and the database tables improves the functioning of the contact center service in a variety of ways, to include seamless concurrent communications between customer and agent across multiple channels, and seamless transitions between agents, who can be added to a customer interaction with relative ease.

20 Claims, 8 Drawing Sheets

DATA MODEL FOR OMNICHANNEL CUSTOMER INTERACTIONS

TECHNICAL FIELD

The present application generally relates to a cloud-based, customer interaction service, sometimes referred to as a contact center service. More specifically, the present application relates to a data model from which a database schema is instantiated, where the database schema supports the representation of omnichannel customer interactions, thereby improving the scalability, performance, and efficiency of an omnichannel customer interaction service.

BACKGROUND

A customer interaction service, or contact center service, is a software-based service that provides a mechanism by which a company can manage inbound and outbound customer engagement events across various communication channels, such as video, voice, webchat, SMS messaging, email, social media, and others. The primary goal of a contact center service is to provide customers with efficient and effective support while enhancing their overall experience with the company. Contact center services are important because they serve as a critical link between a company and its customers, helping to build and maintain strong relationships by addressing customer concerns and providing timely and accurate information. Additionally, contact center services provide valuable insights into customer needs and preferences, which can help inform business strategies and drive innovation. By providing exceptional customer service through a well-managed contact center service, companies can improve customer loyalty, increase customer retention, and gain a competitive advantage in the marketplace.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
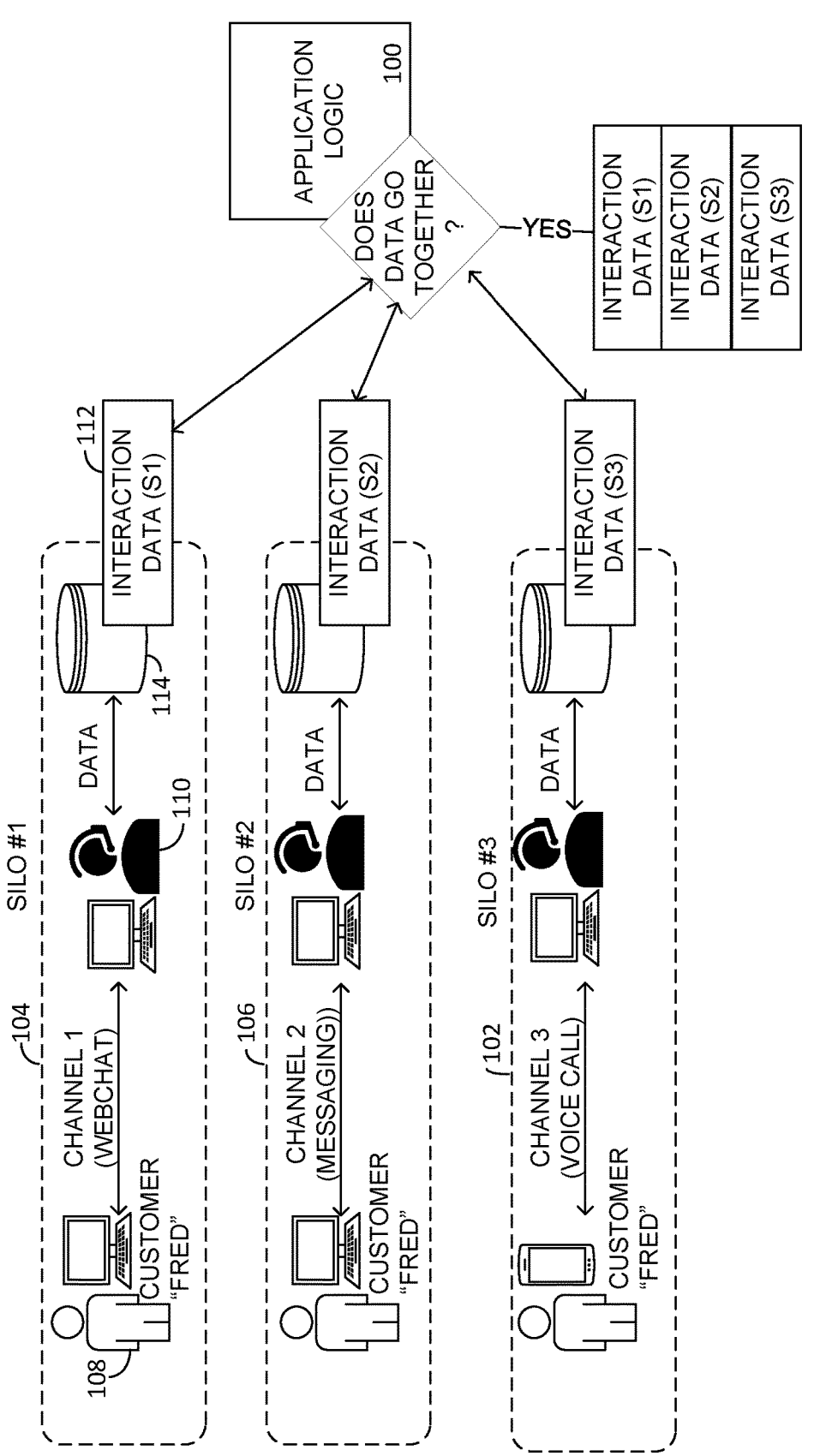
FIG. 1 is a diagram illustrating a conventional multi-channel contact center service, where application logic is deployed to provide a cross channel experience.

Described herein is a data model by which a unified data schema is instantiated to represent omnichannel customer interactions in the context of a cloud-based contact center service. In the following description, for purposes of explanation, numerous specific details and features are set forth in order to provide a thorough understanding of the various aspects of different embodiments of the present invention. It will be evident, however, to one skilled in the art, that the present invention may be practiced and/or implemented with varying combinations of the many details and features presented herein.

Historically, enterprises and organizations have deployed call centers, with contact agents ("agents") dedicated to serving customer issues, taking inquiries, processing orders, and the like. A one-channel or single-channel call center is one where customers can only interact with the company through a single communication channel, typically over the telephone. In these types of call centers, customers are limited to speaking with agents over the telephone to resolve their issues or inquiries.

As technology has advanced, companies have started to incorporate multiple communication channels like video, voice, webchat, SMS messaging, email, and social media, creating what is known as a multi-channel call center. This approach has allowed customers to interact with companies on the channels that they prefer, providing greater flexibility and convenience. However, the challenge with multi-channel call centers has been that each channel operates in a silo, and customer information is not easily shared across channels, which has led to a disjointed experience for customers. That's where omnichannel call centers come in.

An omnichannel call center integrates all of the communication channels into one platform or service, allowing customers to seamlessly move between channels while still receiving personalized service. Agents have access to all of a customer's interaction history (prior customer engagement events), regardless of which channel the customer used, allowing them to provide more efficient and personalized support. For example, if a customer's initial inquiry is made via telephone, and handled by a first agent, when the customer later initiates a webchat, the agent who handles the webchat is provided with historical data about the customer's previous voice call.

However, in many instances, omnichannel contact centers may be omnichannel in name alone. For example, in some instances, existing multi-channel contact center services may be adapted to provide agents and customers with an experience that may appear to be omnichannel, but only through a patchwork or mishmash of application logic. This approach is sometimes referred to as cross channel. With a cross channel contact center service, the contact center enables customers to interact with a company using the channel of their choice, but the customer interactions are not necessarily fully integrated or connected.

FIG. 1 illustrates an example of a multi-channel contact center service that has been modified through application logic 100 to provide some cross channel functionality. As illustrated in FIG. 1, each of three different channels (e.g., voice 102, webchat 104, and messaging 106) is portrayed as its own silo. As a customer interacts with an agent on one channel, the resulting data from that customer interaction is stored in a data structure and data store that is specific to that channel. For example, referring to FIG. 1, when the customer, Fred 108, initiates a webchat with the agent 110, the resulting information representing the webchat is stored in a data structure 112 of a data store 114 that is isolated and accessible only to the webchat channel. If, during the webchat, Fred decides to initiate a voice call, a call router (not shown) may not have immediate access to the data representing the webchat, and therefore may not be able to route the call to the correct agent 110. Moreover, assuming the voice call gets routed to a new agent, the new agent may not have access to the information representing the webchat (e.g., data structure 112, from silo #1). At best, the application logic 100 may query the data store for the webchat channel, and make a determination that information stored in the data store for the webchat channel is relevant to the voice call placed by Fred. However, this may not be accomplished in a timely manner, and therefore, Fred may have to provide information to the agent via the voice call that was already provided via the webchat. This experience is what may be referred to as a cross channel experience.

In the context of a contact center service, cross channel refers to the ability to interact with customers across multiple channels, such as voice, webchat, email, SMS messaging, social media, and more. Cross channel communication enables customers to interact with a company using the channel of their choice, but the interactions are not necessarily integrated or connected. In contrast, a true omnichannel service and experience refers to the ability to provide a seamless and integrated experience for customers across all channels, with a consistent and unified view of the customer's journey across all touchpoints. Omnichannel service enables customers to switch between channels and continue their interaction seamlessly, without having to repeat information or start over, and with little or no delay in establishing new communication sessions across channels.

While cross channel communication is an improvement over traditional single-channel communication, it is not as good as true omnichannel service for several reasons. The first reason is a lack of integration. Cross channel communication, as shown in FIG. 1, enables customers to use different channels to interact with agents of a company, but these interactions are not necessarily integrated or connected. As a result, there may be gaps in the customer's journey and important information may be missed. This lack of integration may be experienced by the customer as delay, for example, as it takes time for the application logic 100 to identify related information stored in separate silos that needs to potentially be deduplicated, consolidated, and in some instances rewritten to a centralized data store. In addition, the customer experience may be inconsistent. For example, cross channel communication can result in an inconsistent experience for customers, as they may have to repeat information or start over when switching between channels.

Managing cross channel communications can be complex and difficult, as it involves multiple systems and services, and multiple data sources storing data that needs to be synchronized and integrated. Accordingly, the processing of data in a cross channel contact system or service can be time-consuming and inefficient, and from a customer's perspective, it may require multiple interactions over multiple channels to complete a single task or transaction. Overall, while cross channel communication is a step in the right direction, it is not as good as a true omnichannel service, which provides a seamless and integrated experience for customers across all channels.

One of the key factors in providing a seamless, integrated, and efficient omnichannel contact center service is the data model that is used to capture customer interactions. If the underlying data model, and thus the database schema and data structures in a contact center service are not properly established to represent an omnichannel customer interaction, several technical problems may arise. For example, if the database schema used to capture customer interactions are not properly aligned across all channels, it can result in inconsistent and incomplete data. For example, if the database schema for webchat messages is different from the database schema for voice calls, it can be difficult to combine these data sets and gain a comprehensive view of the customer's journey. If there are multiple data structures representing the same data, it can lead to duplication of data and wasted storage space. For example, if a customer's contact information is stored separately for each channel, it can lead to duplicated data records and inconsistency in the data. If the data structures used to represent customer interactions are not optimized for efficient data processing, it can result in slow query times and poor system performance. For example, if the data structure used to store webchat messages is not optimized for fast retrieval, it can result in slow response times for customer service agents, particularly when a customer interaction involves concurrent communication over multiple, different channel types. If the data structures used to capture customer interactions are not compatible with other systems, it can lead to integration issues and difficulty in sharing data across platforms. For example, if the data structure used for webchat messages is not compatible with a CRM system, it can be difficult to integrate these two systems and gain a comprehensive view of the customer.

Described herein is an improved data model for representing omnichannel customer interactions. The data model comprises a database schema—for example, a set of related tables—so that a single query can generate a result set that represents a complete view of a customer interaction, including multiple participants (e.g., one customer and multiple agents), across multiple individual customer engagement events that have occurred over multiple communication channels, and over an agent-controlled duration of time. Accordingly, the database schema can capture multiple customer engagement events, across different channels, providing valuable insights into customer behavior, customer preferences, and customer needs. These individual engagement events can include customer interactions such as video and voice calls, webchat, SMS messages, emails, social media interactions, and more. Having a unified or single data structure to capture these events can offer several advantages.

Consistent with some embodiments, data records stored in a tables corresponding with a unified database schema can provide a single source of truth for all customer interactions, allowing businesses to gain a holistic view of each customer's engagement history across all available channels. This can help businesses identify patterns, trends, and preferences, and enable them to offer more personalized and effective customer experiences. Additionally, by using a database schema that appropriately relates the customer interaction data, companies and enterprises can ensure that data is consistent and accurate across all channels, reducing the risk of data duplication or errors. This can help businesses make more informed decisions based on reliable data. Managing multiple data structures can be complex and time-consuming. By using a single database schema for capturing omnichannel customer interactions, businesses can streamline their data management processes, reduce data silos, and improve data accessibility. Finally, a unified database schema can enable more robust customer management, analytics and reporting capabilities, allowing businesses to identify key performance indicators (KPIs) and metrics across channels, and gain insights into customer behavior and trends. This can help businesses make data-driven decisions and improve overall performance.

The contact center service is described herein as facilitating communications between customers and agents. Those skilled in the art will readily recognize that, consistent with various implementations, the service itself may be referred to as something other than a contact center service. For example, the contact center service may be referred to generally as a customer interaction system or customer interaction service, or more simply as an interaction system or interaction service. Furthermore, in a particular implementation or instance, the agent end-users and the customer end-users may be referred to in terms other than "agent" and "customer." For instance, an agent may be a representative of a company, but may also be a volunteer for an organization, or may have some other relationship with the entity on whose behalf the end-user is operating, and thus may be referred to by a variety of names other than "agent." Similarly, in many implementations, particularly when the contact center service or interaction service is deployed by a traditional company that has customers, the customer end-users are properly referred to as "customers." However, in a variety of alternative implementations, the end-user may be generally known as and referred to by some name other than "customer." By way of example, an interaction service, consistent with embodiments described herein, may be deployed for purposes of a political campaign, in which case the end-users may be referred to as voters. Similarly, in the context of a health care service, the end-users may be referred to as patients. In any of a wide variety of other specific contexts, the end-user may be referred to as something other than a customer. Other aspects and advantages of the present invention will be readily apparent from the descriptions of the several figures that follow.

Figure 2:
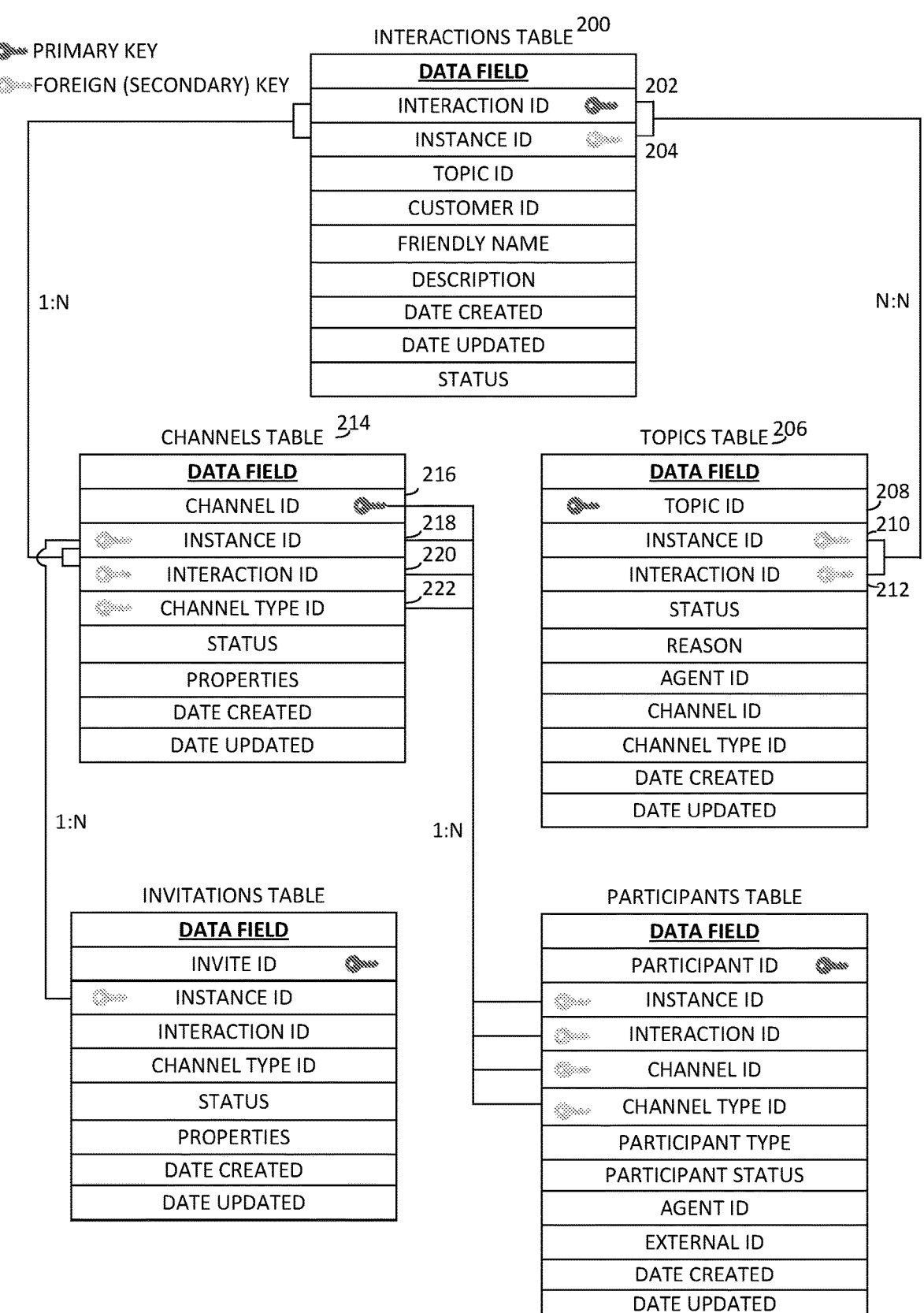
FIG. 2 is a diagram of an improved data model from which a database schema and corresponding data structures are instantiated to represent omnichannel customer interactions, consistent with some embodiments.

FIG. 2 is a diagram of an improved data model from which a customer interaction database schema is instantiated to represent omnichannel customer interactions, consistent with some embodiments. In the context of an omnichannel contact center service, a customer interaction is a concept intended to represent one or more individual customer engagements sometimes referred to as touchpoints with a customer. These customer engagement events occur over time, and as such, a customer interaction is defined to have one of several states. For example, an active or open customer interaction is one that is ongoing and has not yet concluded. A customer interaction may be paused (e.g., inactive) and ultimately, closed. With some embodiments, a closed customer interaction can no longer be updated. A customer interaction is also defined to have a topic, which may be a subject matter, a goal or an objective. For instance, as will be described below, the topic data record provides a way for each customer to categorize customer interactions in a customizable and flexible manner.

As shown in FIG. 2, the interactions table 200 has several data fields, including a first data field that serves as a primary key (e.g., interaction ID) 202. In this example, the combination of the interaction ID 202 and an instance ID 204 serve as a foreign or secondary key. In the context of data and a relational database, a primary key is a column or set of columns that uniquely identifies each row in a table. It is used to enforce data integrity and ensure that there are no duplicate rows in the table. The primary key is defined when the table is created and is typically a column that contains unique values. A secondary global key, also known as a foreign key, is a column or set of columns in one table that refers to or relates to one or more data fields of another table. It is used to establish relationships between tables and enforce referential integrity. By linking tables together through foreign keys, complex data models can be created that can efficiently store and retrieve data.

As shown in FIG. 2, the primary key for the interactions table 200 is the interaction ID. However, in alternative embodiments, a combination of data fields may be used as the primary key. Specifically, with some embodiments, the primary key may be a data field to store a combination of the interaction ID, the instance ID and perhaps an account ID (not shown). Whereas an instance ID is used to identify a specific instance of the omnichannel contact center service in use by a specific customer, an account ID can be used as another organizational layer, such that one account (e.g., customer) may have multiple different instances of the contact center service active at any one time. This may be done, for example, to have separate instances of a contact center service for different geographical locations, or company departments, and so forth.

As shown in FIG. 2, in addition to the primary and foreign keys, the interactions table 200 has data fields for storing a topic ID, a customer ID, a friendly name (e.g., for the customer), a description, a date created, a date updated, and a status. When an interaction is first created, its status may be set to "active" by default. Subsequently, the status of the interaction may be set to "inactive", or "closed." This may be done, automatically, for example, by one or more integrated services, or manually by an agent interacting with a user interface.

A second table shown in FIG. 2 is the topics table 206. The topics table 206 has several data fields for capturing a topic data record, including a primary key (e.g., topic ID) 208, and a combination of data fields used as a foreign or secondary key—for example, the instance ID 210 and interaction ID 212. Additionally, the topics table 206 has data fields for a status, a reason, agent ID, channel ID, channel type ID, a date created, and a date updated. When an agent is engaged with a customer, the agent may provide information via a user interface to populate one or more of the data fields for the topic data record, while other data fields are populated with data automatically, for example, by one or more integrated services of the contact center service.

As shown in FIG. 2, with some embodiments, the relationship between the interactions table and the topics table is an N-to-N ("N: N") relationship, indicating that for every one interaction data record there is exactly one topic data record. However, in some alternative embodiments, a single interaction data record may have zero, or multiple associated topic data records (e.g., a 1-to-N ("1: N") relationship).

A third table shown in FIG. 2 is the channels table 214. The channels table 214 has several data fields for capturing a channel data record, including a primary key (e.g., channel ID) 216, and a combination of data fields used as a foreign or secondary key—for example, the channel ID 216, instance ID 218 interaction ID 220, and channel type ID 222. Additionally, the channels table 214 has data fields for a status, properties, a date created, and a date updated.

Importantly, the relationship between the channels table 214 and the interactions table is shown to be one-to-N, meaning that for one interaction data record, there may be multiple channel data records. As will be described in greater detail below, this allows for a customer to seamlessly interact with one or more agents over multiple channels, while each agent has real-time access to all of the data associated with the customer interaction. In some embodiments, it may be possible to have zero channels associated with a customer interaction. For instance, this may be the case when an interaction data record is established in anticipation of a customer engagement event, prior to the event actually occurring.

In addition to the channels table 214, FIG. 2 shows an invitations table 224, and a participants table 226. Whenever an agent is invited to participate in a customer interaction, a data record in the invitations table 226 is created. Here again, the relationship between the channels table 214 and the invitations table is shown to be one-to-N ("1: N"), indicating that multiple agents may be invited to participate in a customer communication over the same channel, as part of the same customer interaction. Similarly, the relationship between the participants table 226 and the channels table 214 is shown to be one-to-N ("1: N") to reflect that multiple participants (e.g., agents) can be involved in any one customer engagement on the same channel, as part of a single customer interaction.

While each of the tables shown in FIG. 2 is depicted as having certain data fields, and being related via various keys, one skilled in the art will readily appreciate that any one table may have more or fewer specific data fields and use different keys, while being consistent with the overall scope of the innovative subject matter being conveyed herein.

Figure 3:
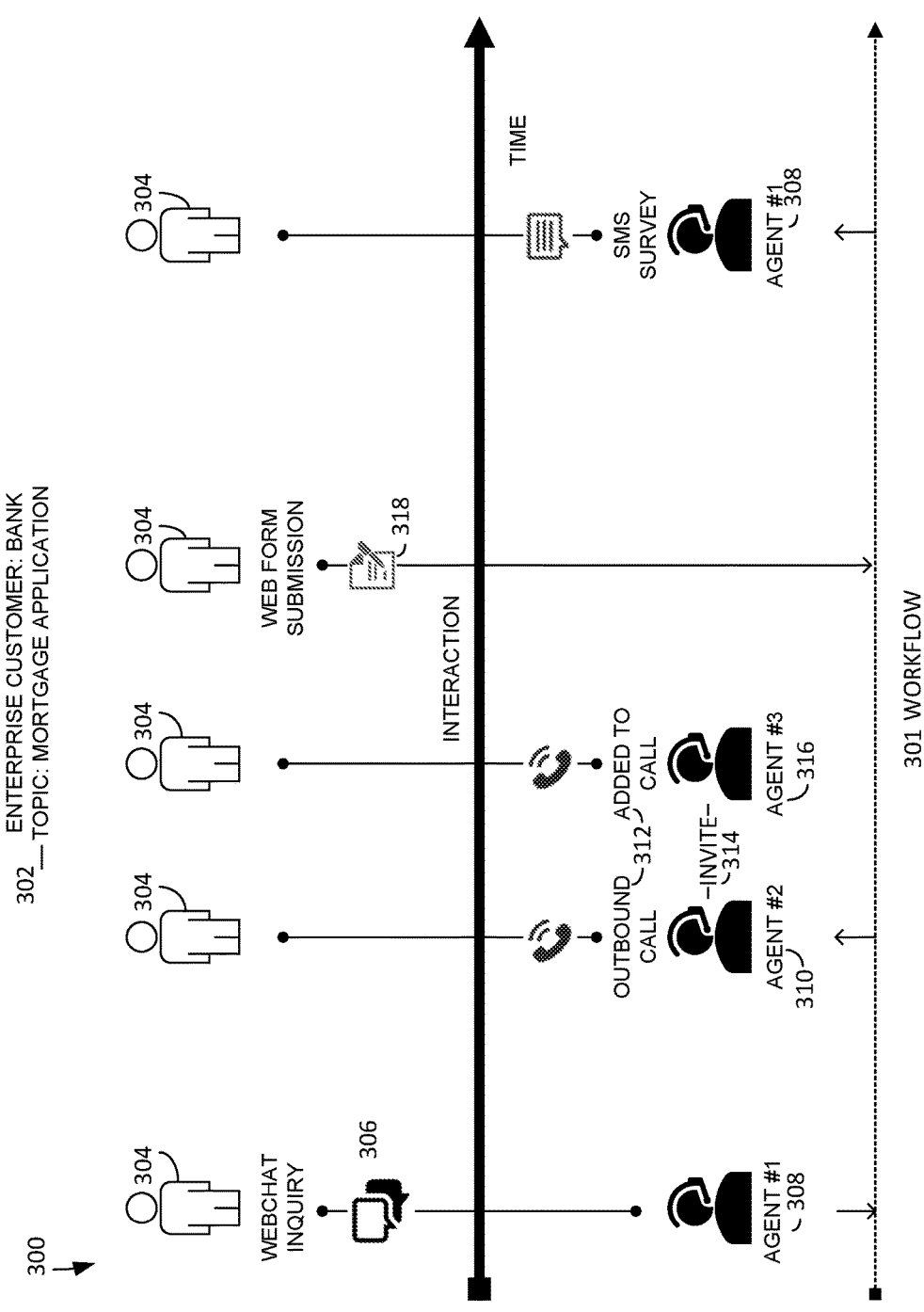
FIG. 3 is a diagram illustrating a visual example of the customer and agent experience, with respect to an omnichannel customer interaction, consistent with some embodiments.

Turning now to FIG. 3, a diagram is shown illustrating a visual example of the omnichannel customer and agent experience, with respect to an omnichannel customer interaction, consistent with some embodiments. As shown with reference 302, the customer interaction illustrated in FIG. 3 is associated with the customer-defined topic, "mortgage application." Consistent with some embodiments, every instance of a customer interaction data record is associated with at least one instance of a topic data record. This provides each enterprise customer with the ability to separate customer interactions around custom topics, objectives, or goals. For instance, in this example, a financial institution, such as a bank, may want to group customer interactions around their business lines. Accordingly, one topic may be established for mortgage loans or applications, while another topic may be established for auto loans, and so forth. When a customer initiates a communication session relating to a particular topic, a new interaction data record will be generated. For example, as shown in FIG. 3, a customer 304 has invoked a webchat session 306 with a first agent 308. This webchat session may have been invoked while the customer 304 was viewing a webpage relating to the bank's mortgage offerings. Accordingly, when the interaction data record is created, as a result of the customer invoking the webchat, the topic for the customer interaction is automatically communicated and updated, based on the context associated with the webchat. When this event occurs and is processed by the contact center service, data records are created within each of the tables to capture the data generated from the event. For example, an interaction data record is created in the interactions table, where the topic is "mortgage application." For purposes of this example, the interaction data record will be the primary data record for the entire customer interaction. Accordingly, the customer interaction begins with the request by the customer 304 to invoke a webchat 306 with an agent 308. The customer interaction may end—and have its status updated to "closed"—upon completion of the processing of the mortgage application. As shown in FIG. 3 and described below; the customer 304 may have multiple engagements with different agents over multiple different communication channels during the customer's journey complete a mortgage application.

In this example, after the customer 302 has completed a webchat 306 with the first agent 308, a second agent 310 initiates an outbound call 312 to the customer 304. This may be triggered as part of a customer defined workflow 301 established by the bank. For example, the second agent 310 may receive information via a user interface, triggered as part of the workflow 301, including an automatically generated notification or work task indicating that the agent is responsible for contacting the customer 304. During the call, the second agent 310 discusses with the customer 304 his or her banking needs and determines that a particular mortgage product is a best first for the customer 304. Accordingly, while the second agent 310 is still connected with the customer via a voice call 312, the second agent interacts with a user interface of the contact center service to send an invitation 314 to a third agent 316 who is a specialist in the specific mortgage loan product best suited to the needs of the customer 304. Prior to accepting the invitation 314, a user interface presented to the third agent 316 may be populated with data from the set of tables 200 representing the customer interaction. Accordingly, even before the third agent accepts the invitation to join the ongoing voice call, the third agent may be privy to the needs of the customer 304. When the third agent 316 accepts the invitation, the third agent 316 is added to the ongoing call with the customer.

Subsequent to the call 312, the customer 304 completes an online application for the mortgage, for example, by providing information via a web form that is associated with the workflow 301. When the customer submits the web form 318, a workflow 301 task is created. Specifically, the first agent 308 is presented a user interface with information relating to the customer's prior experience, as obtained via the interaction data record 200 associated with the customer interaction, and tasked with sending the customer 304 an SMS message with a link to a customer survey 318. At some point, perhaps after receiving the survey response, the first agent 308 may update the status of the customer interaction to indicate that the customer interaction has been completed.

Accordingly, the database schema, as shown in FIG. 2, stores data records that provide a single source of truth for representing multiple customer communications over multiple communication channels between a customer and multiple agents, or a system, where all related communications are associated with a common topic. Here, a topic is a concept that allows for customization by the enterprise or company. For example, a company may want to group customer interactions by some common goal or objective, by specific departments, by different business lines, and so forth. A sales organization may elect to have topics relating to the customer journey, thereby grouping customer interactions by pre-sales, an actual sale or purchase transaction, onboarding, and ultimately support and retention. A financial institution may elect to have topics to group customer interactions by business lines, for example, mortgage loans, auto loans, and so forth.

Although not shown in FIG. 3, several other communication channels may be included as part of a customer interaction. For example, an email or a social media message may be stored as part of an interaction data record. Similarly, the workflow 301 shown in FIG. 3 may be customized by each customer. For example, with some embodiments, various agent tasks may be invoked or triggered based on the occurrence of various events associated with any of the several communications channels. By way of example, a social media comment made by a customer may trigger a review and possible outreach by an agent.

Figure 4:
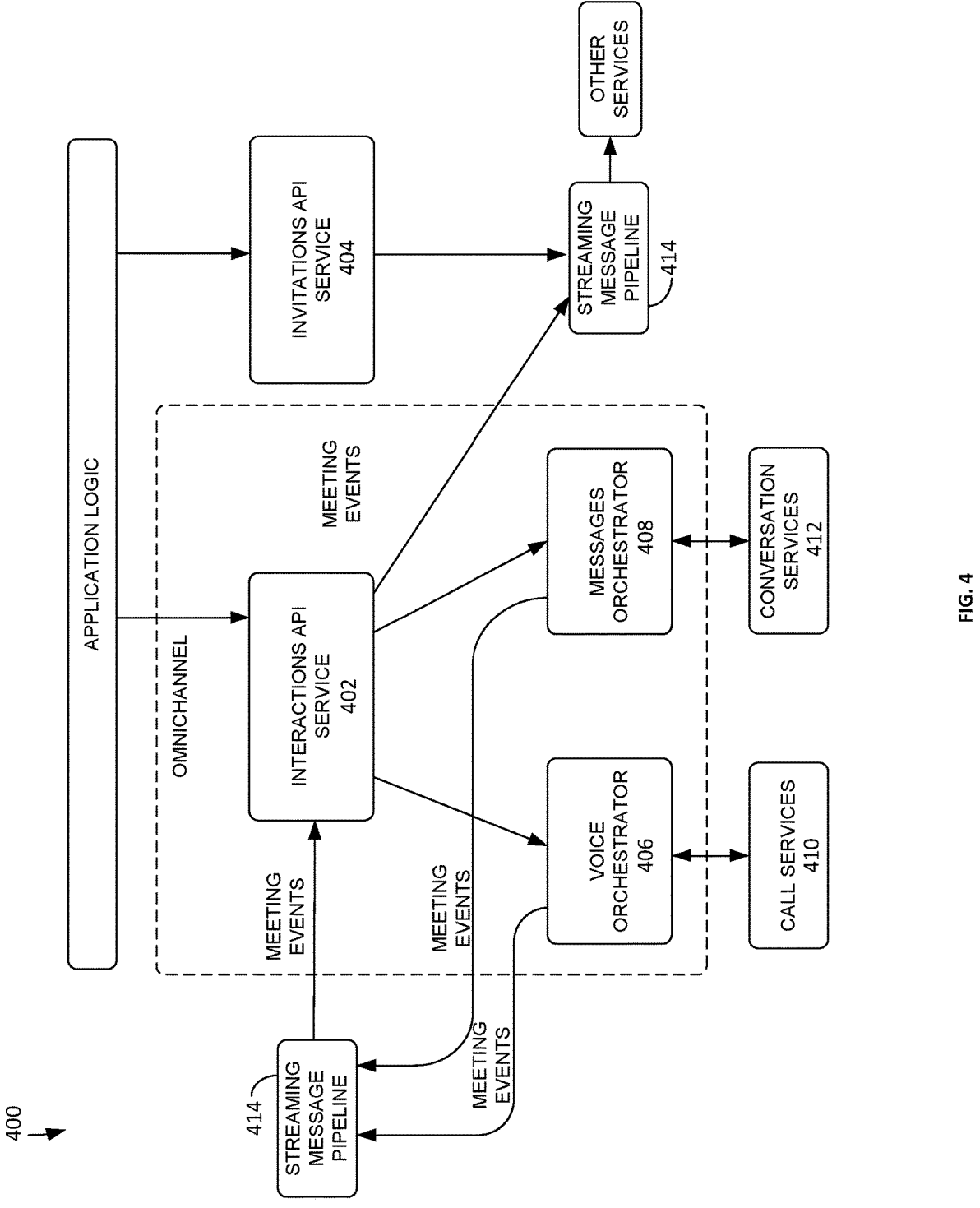
FIG. 4 is a system diagram illustrating an example of an architecture, or portion thereof, for a cloud-based, omnichannel contact center service that facilitates omnichannel customer interactions, consistent with some embodiments.

FIG. 4 is a system diagram illustrating an example of an architecture 400, or portion thereof, for a cloud-based contact center service that facilitates omnichannel customer interactions, consistent with some embodiments. As illustrated in FIG. 4, the voice orchestrator 406 is responsible for managing and coordinating the various aspects of voice communications between customers and contact center agents. It is a software component or system that handles the routing, control, and monitoring of voice calls within the contact center environment. Specifically, the voice orchestrator 406 interfaces with the call services 410, which provides the actual telephony services.

The messages orchestrator 408 is a software component or system that manages and coordinates interactions across multiple messaging channels, allowing seamless conversations between customers and contact center agents. It is responsible for orchestrating and synchronizing conversations across various non-voice communication channels, such as email, webchat, social media, and other messaging platforms. The conversation orchestrator aims to provide a unified and consistent customer experience across these different channels by interfacing with the actual conversation services 412.

Consistent with some embodiments, and as shown in FIG. 4, some of the functionality provided by the contact center service is facilitated via one or more application programming interface (API) services and related API calls, while other functionality may be triggered via receiving meeting event messages via a streaming message distribution service (e.g., such as Apache Kafka®). Specifically, as shown in FIG. 4, there is an interactions API service 402 and an invitations API service 404. These API services are generally responsible for creating and managing (e.g., updating) various data records associated with several of the set of related tables described in FIG. 2.

By way of example, when a customer invokes a webchat, the incoming webchat request will go through the conversation services 412 and be received at the messages orchestrator 408. The messages orchestrator 408 will then publish a meeting event message via a queue (e.g., a topic) to the streaming message pipeline 414. The interactions API service 402, as a subscriber to messages published via the queue, will receive and process the meeting event message. If the customer and webchat are determined, by the interactions API service 402, to be associated with an existing (e.g., an active) customer interaction data record, then the interactions API service 402 will add the relevant data relating to the incoming webchat request to the appropriate tables (e.g., as in FIG. 2). However, if no existing or active customer interaction data record exists, then a new interaction data record will be created in the interactions table.

Similarly, the invitations API service 402 may receive the meeting event message and determine that an agent needs to be invited to handle the incoming webchat request. After an agent has been invited via the invitation API service 404 to join the incoming customer webchat and the agent accepts the invitation, the invitations API service 404 will publish the appropriate meeting event message to a queue (e.g., a topic) of the streaming message pipeline 414. Another service will receive and process the message, while updating the appropriate record in the set of customer interaction tables.

After the webchat between the customer and the agent has concluded, the message orchestrator 408 will once again publish a meeting event message to indicate the conclusion of the webchat. The published meeting event message is then processed by the interactions API service 402, which will then update the appropriate tables to reflect the status of the webchat communication session between the customer and the agent.

With some embodiments, when a customer has an active communication session on one communication channel (e.g., a webchat), a second communication channel (e.g., voice) can be added concurrently, via the appropriate API requests. For instance, the customer may be added to a voice call by an agent making an outbound call. Alternatively, the customer may make an inbound call. When the inbound call is processed, the voice orchestrator will publish a meeting event message to the streaming message pipeline 414, which is then processed by the interactions API service. The interactions API service may determine that an agent currently active via the existing webchat session with the customer should be added to the voice call. As such, an invitation will be extended to the agent (assuming the agent meets certain voice call routing requirements-such as, having sufficient attention capacity). When the agent accepts the invitation, the agent will be added to the voice call with the customer. When the agent is presented with the invitation, various data from the set of related interaction data records can be presented to the agent, so that the agent understand exactly who the agent will be speaking with even before joining the voice call. This is all possible due to the way the data is arranged and managed via the database schema presented in FIG. 2.

As shown in FIG. 4, the interactions and invitations API services 402 and 404 provide a mechanism by which the customer interaction data can be managed, maintained and accessed. The database schema for capturing and storing customer interaction data, including the data relating to topics, channels, invitations and participants, is structured so as to be related. Thus, the processing of the underlying data structures is both fast and efficient. This, for example, enables seamless transitions from one channel to another, in real time. Similarly, the adding of a new agent, or the transferring from one agent to another, of an active communication session is simplified via the improved database schema described herein.

Figure 5:
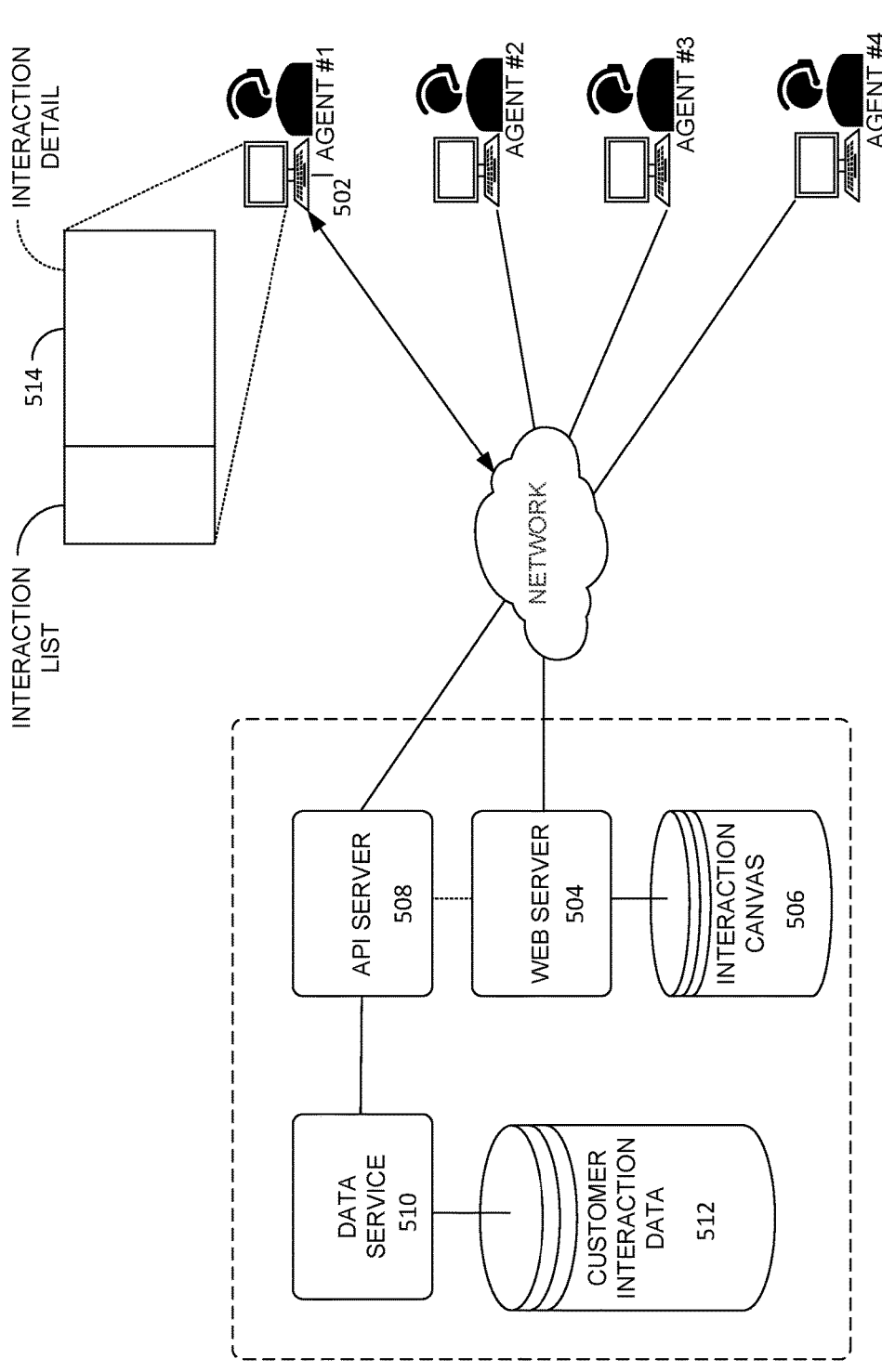
FIG. 5 is a system diagram illustrating an example of a system for generating a web-based user interface for viewing and managing omnichannel customer interaction data, consistent with some embodiments.

In addition to facilitating seamless connections and transitions between multiple different communication channels, and between multiple different agents, the database schema presented in FIG. 2 also makes it possible to present each agent with an interactive user interface via which the agent can not only view the specific customer interactions to which the agent is assigned, but also view historical data relating to prior customer engagement events associated with the same interaction. FIG. 5 is a is system diagram illustrating an example of a system for generating a web-based user interface for omnichannel customer interactions, consistent with some embodiments.

As illustrated in FIG. 5, an agent 502 is using a conventional web browser application to access a web server 504 that is part of the cloud-based contact center service. The web browser application, as shown with reference 514, is presenting to the agent a user interface 514 for viewing and managing omnichannel customer interactions. The data presented to the agent 502 via the user interface 514 is obtained by querying the set of database tables shown in FIG. 2, for example.

Consistent with some embodiments the web server 504 will process an HTTP request, specifying a URL, as received from the client-side web browser application 502 of the agent. Upon processing the request, the web server 506 will communicate a web document or web page over the network to the web browser application 502. Upon processing the received web page, the web browser application will invoke one or more API requests to the API server 508, requesting various data elements associated with customer interactions that are assigned to the agent, for example, as a result of the agent being designated as a participant in the customer interaction. The API server will process the request(s) received by the client web browser application 502 by requesting from a data service 510 various data elements associated with the customer interactions (e.g., interaction data 512, in FIG. 5).

Consistent with some embodiments, the process of rendering the customer interaction user interface is achieved via a client-side or browser-side API request technique. Typically, this may involve JavaScript in the web page making AJAX requests (e.g., Asynchronous Javascript and XML) requests or more modern approaches like the Fetch API or XMLHttpRequest to communicate with the API server. However, in alternative embodiments, a single request received from the web browser application may be processed on the server side, for example, through one or more API requests to obtain the required data, which is then communicated to the web browser application 502.

In comparison with conventional techniques, particularly those that may have been implemented with multi-channel or cross channel contact center services, the database schema of the present invention has a significant impact on the ability and efficiency of rendering the customer interaction user interface (e.g., the web page) on the client, especially when dealing with frequently updated and interactive data, as is the case with customer interaction data. Specifically, by properly structuring the data in the databased, this allows for efficient querying and retrieval of the customer interaction data. By organizing the data into normalized tables and establishing appropriate relationships (such as foreign keys and foreign key constraints), the database can retrieve the relevant data with minimal complexity and optimized performance.

A properly structured database enables the use of indexes (e.g., based on primary keys, and/or foreign keys), which are essential for optimizing query performance. Indexes help in speeding up data retrieval operations by allowing the data service 510 to locate and fetch the required customer interaction data 512 more quickly. By leveraging appropriate indexes on frequently accessed columns, the efficiency of queries used in rendering the customer interaction user interface can be significantly improved. In interactive web applications where data is frequently updated, a well-structured database can facilitate smooth and efficient updates. By organizing data into logical entities and establishing proper relationships, updates can be performed with minimal impact on other related data. This ensures that only the necessary data is updated, reducing the processing time and allowing for a more responsive user experience. In the specific context of the omnichannel contact center service, this means that agents are able to respond more quickly to customer requests (e.g., inbound communication sessions, on multiple channels), transition a particular communication session from one agent to another and so forth.

Figure 6:
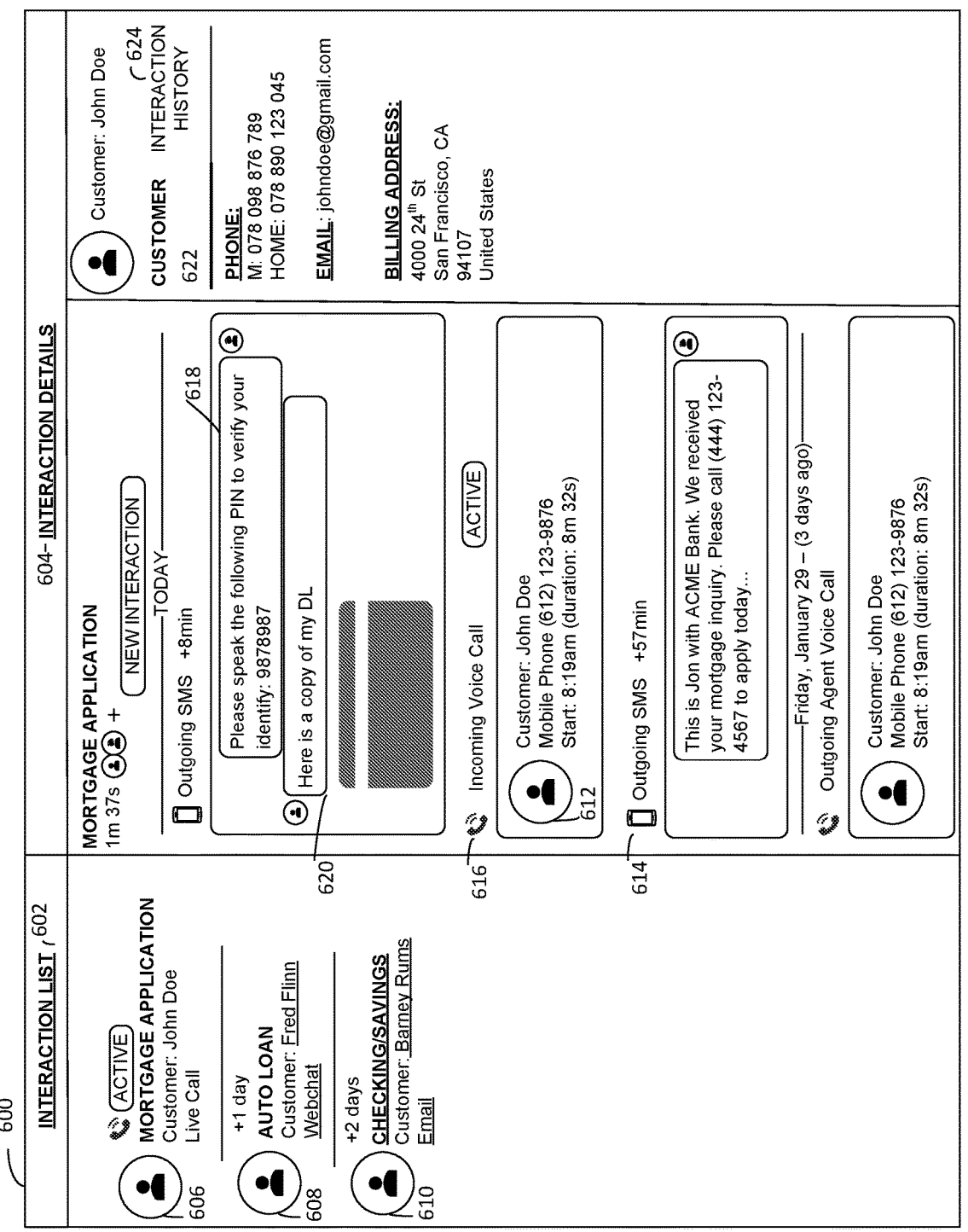
FIG. 6 is a diagram illustrating an example of a user interface, as may be generated by the system illustrated in FIG. 5, consistent with some embodiments.

FIG. 6 is a diagram illustrating an example of a customer interaction user interface, as may be generated by the system illustrated in FIG. 5 and presented to an agent, consistent with some embodiments. The user interface 600 is generally comprised of separate panes, panels, components or frames. For example, as shown in the user interface 600, a first pane on the left side is referred to as the interaction list 602. Consistent with some embodiments, the interactive list 602 shows a list of all active customer interactions of which the agent is a participant. In this example, three separate customer interactions are represented in the interaction list. With some embodiments, the individual customer interactions may be presented in an order that is based on the most recent active communication session or customer engagement event that has occurred between the customer and an agent. For instance, in this particular example, the topmost customer interaction 606 is showing that an active voice call is currently on going with the customer, whereas the next customer interaction 608 involved a webchat one day prior, and the final customer interaction 610 in the list involved an email two days prior.

Although not shown in FIG. 6, with some embodiments, a user interface element may allow the agent to filter and/or search for customer interactions. For example, an agent may be able to filter customer interactions by their respective state (e.g., active, paused or inactive, and closed), by communication channel (e.g., video, voice, webchat, SMS, email, or other), or by any of a wide variety of other criteria.

With some embodiments, when the agent makes a selection of a particular customer interaction 606 displayed in the customer interaction list 602, a detailed view of the customer interaction will be presented in the pane or panel on the right side of the user interface, labeled here as "interaction details" 604. In the interaction details pane 604, a chronological list of customer engagement events for the selected customer interaction are shown, where the customer engagement event 612 that occurred most recently is positioned at the top of the list. Here, in this example, the customer engagement event 612 is an active voice call.

As illustrated in FIG. 6, the set of related tables (e.g., as illustrated in FIG. 2) facilitates an omnichannel experience by allowing data records to be updated for each communication channel that is opened, where multiple communication channels can be open or active simultaneously. For instance, in the example shown in FIG. 6, an outgoing SMS message has been sent by an agent, to the customer, as evidenced by reference number 614. The SMS message 614 has prompted the customer, John Doe, to place a call to a specific phone number to speak with an agent and complete an application for a mortgage. Accordingly, as indicated by reference number 616, the customer, John Doe, has made an incoming call that is shown in FIG. 6 as still active. While on the phone with the customer, the agent sends the customer an SMS message with a verification code (e.g., a PIN—9878987) 618, asking the customer via the SMS message to verify his identity by speaking back the PIN over the voice call that is currently active. Then, after verifying the customer, the agent asks the customer to communicate via SMS message a picture of the customer's driver license. As shown in FIG. 6, the customer has sent a picture of a driver license 620 via SMS message.

Of particular importance with respect to the example presented above is that the underlying database schema—the set of related tables-allows for each user interface component to be updated quickly and efficiently by querying for the relevant data item, where all of the relevant data is tied together as part of the same overall data structure.

Finally, as shown in the right most portion of the interaction detail pane 604, a customer detail pane 622 is shown, displaying various details relating to the customer. As shown with reference number 624, a selectable user interface element is presented. This button or tab, labeled "interaction history" 624, when selected, will cause a presentation or display of an interaction timeline, for example, showing prior customer interactions of which, the customer was a participant. This allows the agent to obtain critical information about the customer's prior interactions and transactions, and so forth.

Machine Architecture

Figure 7:
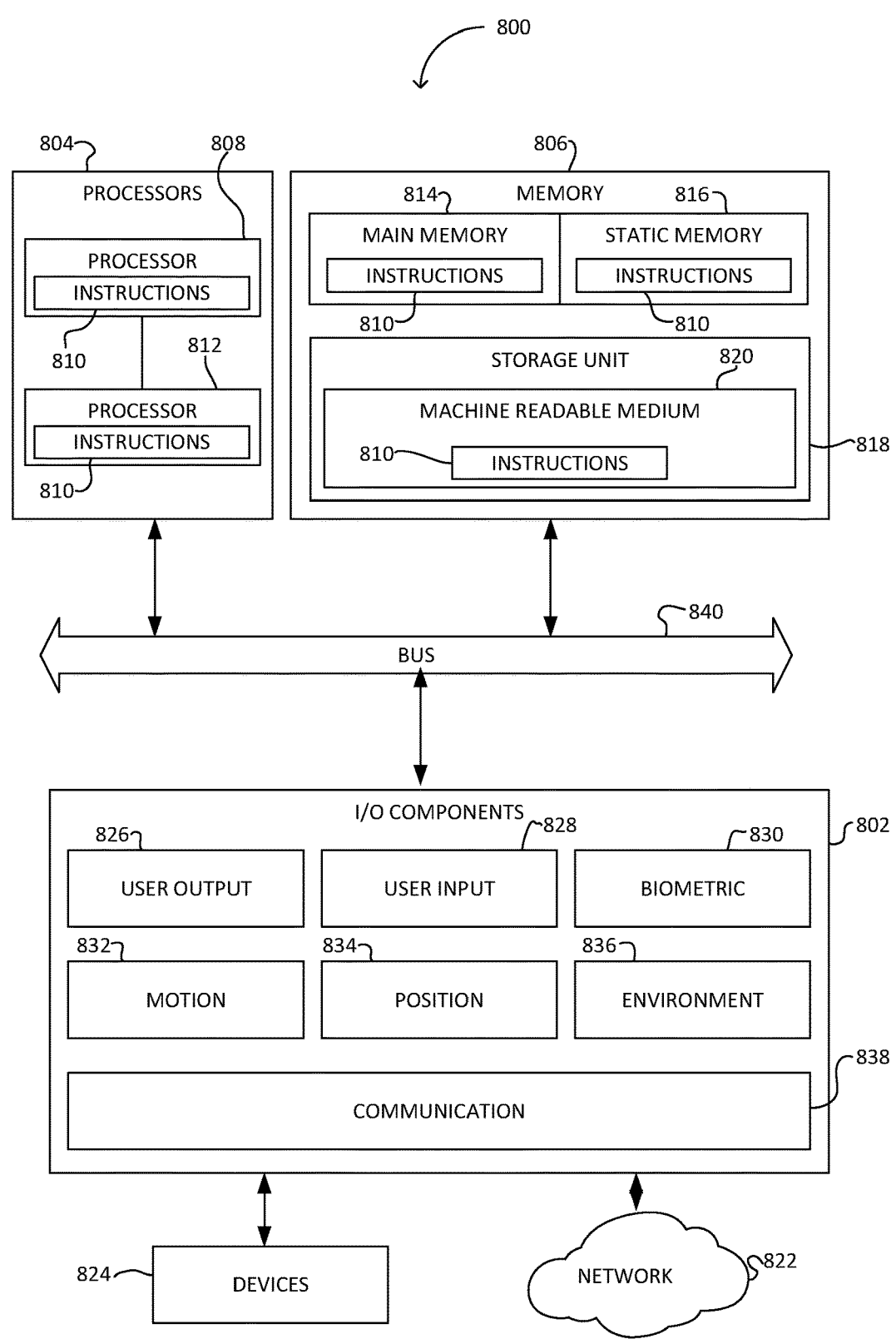
FIG. 7 is a diagrammatic representation of a computing device (e.g., a machine) within which instructions for causing the computing device to perform any one or more of the methodologies discussed herein may be stored and executed.

FIG. 7 is a diagrammatic representation of a machine 800—sometimes referred to as a computing device—within which instructions 810 (e.g., software, a program, an application or app, or other executable code) for causing the machine 800 to perform any one or more of the methodologies discussed herein may be executed. For example, the instructions 810 may cause the machine 800 to execute any one or more of the methods described herein. The instructions 810 transform the general, non-programmed machine 800) into a particular machine 800 programmed to carry out the described and illustrated functions in the manner described. The machine 800 may operate as a standalone device or may be coupled (e.g., networked) to other machines. In a networked deployment, the machine 800 may operate in the capacity of a server machine or a client machine (e.g., client computing device) in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while a single machine 800 is illustrated, the term "machine" shall also be taken to include a collection of machines that individually or jointly execute the instructions 810 to perform any one or more of the methodologies discussed herein. The machine 800, for example, may comprise the client machine(s) or any one of multiple server devices forming part of the system 400. In some examples, the machine 800 may also comprise both client and server systems, with certain operations of a particular method or algorithm being performed on the server-side and with certain operations of the particular method or algorithm being performed on the client-side.

Figure 8:
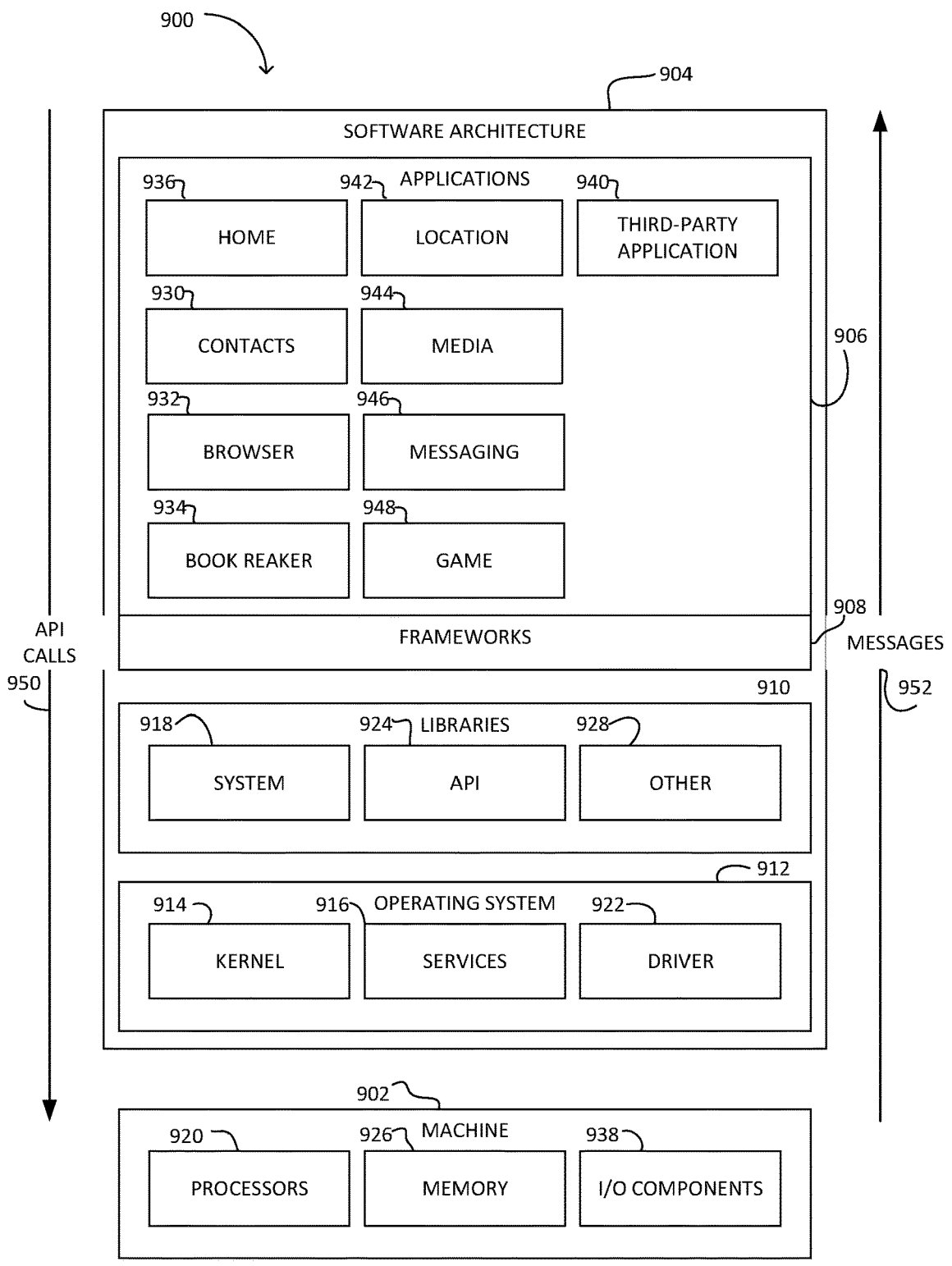
FIG. 8 is a block diagram illustrating a software architecture, which can be installed on any one or more of the devices described herein.

The machine 800 may include processors 804, memory 806, and input/output I/O components 802, which may be configured to communicate with each other via a bus 840. In an example, the processors 804 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 808 and a processor 812 that execute the instructions 810. The term "processor" is intended to include multi-core processors that may comprise two or more independent processors (sometimes referred to as "cores") that may execute instructions contemporaneously. Although FIG. 8 shows multiple processors 804, the machine 800 may include a single processor with a single core, a single processor with multiple cores (e.g., a multi-core processor), multiple processors with a single core, multiple processors with multiples cores, or any combination thereof.

The memory 806 includes a main memory 814, a static memory 816, and a storage unit 818, all accessible to the processors 804 via the bus 840. The main memory 806, the static memory 816, and storage unit 818 store the instructions 810 embodying any one or more of the methodologies or functions described herein. The instructions 810 may also reside, completely or partially, within the main memory 814, within the static memory 816, within machine-readable medium 820 within the storage unit 818, within at least one of the processors 804 (e.g., within the processor's cache memory), or any suitable combination thereof, during execution thereof by the machine 800.

The I/O components 802 may include a wide variety of components to receive input, provide output, produce output, transmit information, exchange information, capture measurements, and so on. The specific I/O components 802 that are included in a particular machine will depend on the type of machine. For example, portable machines such as mobile phones may include a touch input device or other such input mechanisms, while a headless server machine will likely not include such a touch input device. It will be appreciated that the I/O components 802 may include many other components that are not shown in FIG. 8. In various examples, the I/O components 802 may include user output components 826 and user input components 828. The user output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 802 may include biometric components 830, motion components 832, environmental components 836, or position components 834, among a wide array of other components. The motion components 832 include acceleration sensor components (e.g., accelerometer), gravitation sensor components, rotation sensor components (e.g., gyroscope).

The environmental components 836 include, for example, one or more image sensors or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 834 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 802 further include communication components 838 operable to couple the machine 800 to a network 822 or devices 824 via respective coupling or connections. For example, the communication components 838 may include a network interface component or another suitable device to interface with the network 822. In further examples, the communication components 838 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 824 may be another machine or any of a wide variety of peripheral devices (e.g., a peripheral device coupled via a USB).

Moreover, the communication components 838 may detect identifiers or include components operable to detect identifiers. For example, the communication components 838 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 838, such as location via Internet Protocol (IP) geolocation, location via Wi-Fi® signal triangulation, location via detecting an NFC beacon signal that may indicate a particular location, and so forth.

The various memories (e.g., main memory 814, static memory 816, and memory of the processors 804) and storage unit 818 may store one or more sets of instructions and data structures (e.g., software) embodying or used by any one or more of the methodologies or functions described herein. These instructions (e.g., the instructions 810), when executed by processors 804, cause various operations to implement the disclosed examples.

The instructions 810 may be transmitted or received over the network 822, using a transmission medium, via a network interface device (e.g., a network interface component included in the communication components 838) and using any one of several well-known transfer protocols (e.g., hypertext transfer protocol (HTTP)). Similarly, the instructions 810 may be transmitted or received using a transmission medium via a coupling (e.g., a peer-to-peer coupling) to the devices 824.

Software Architecture

FIG. 8 is a block diagram 900 illustrating a software architecture 904, which can be installed on any one or more of the devices described herein. The software architecture 904 is supported by hardware such as a machine 902 that includes processors 920, memory 926, and I/O components 938. In this example, the software architecture 904 can be conceptualized as a stack of layers, where each layer provides a particular functionality. The software architecture 904 includes layers such as an operating system 912, libraries 910, frameworks 908, and applications 906. Operationally, the applications 906 invoke API calls 950 through the software stack and receive messages 952 in response to the API calls 950.

The operating system 912 manages hardware resources and provides common services. The operating system 912 includes, for example, a kernel 914, services 916, and drivers 922. The kernel 914 acts as an abstraction layer between the hardware and the other software layers. For example, the kernel 914 provides memory management, processor management (e.g., scheduling), component management, networking, and security settings, among other functionalities. The services 916 can provide other common services for the other software layers. The drivers 922 are responsible for controlling or interfacing with the underlying hardware. For instance, the drivers 922 can include display drivers, camera drivers, BLUETOOTH® or BLUETOOTH® Low Energy drivers, flash memory drivers, serial communication drivers (e.g., USB drivers), WI-FIR: drivers, audio drivers, power management drivers, and so forth.

The libraries 910 provide a common low-level infrastructure used by the applications 906. The libraries 910 can include system libraries 918 (e.g., C standard library) that provide functions such as memory allocation functions, string manipulation functions, mathematic functions, and the like. In addition, the libraries 910 can include API libraries 924 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 910 can also include a wide variety of other libraries 928 to provide many other APIs to the applications 906.

The frameworks 908 provide a common high-level infrastructure that is used by the applications 906. For example, the frameworks 908 provide various graphical user interface (GUI) functions, high-level resource management, and high-level location services. The frameworks 908 can provide a broad spectrum of other APIs that can be used by the applications 906, some of which may be specific to a particular operating system or platform.

In an example, the applications 906 may include a home application 936, a contacts application 930, a browser application 932, a book reader application 934, a location application 942, a media application 944, a messaging application 946, a game application 948, and a broad assortment of other applications such as a third-party application 940. The applications 906 are programs that execute functions defined in the programs. Various programming languages can be employed to create one or more of the applications 906, structured in a variety of manners, such as object-oriented programming languages (e.g., Objective-C, Java, or C++) or procedural programming languages (e.g., C or assembly language). In a specific example, the third-party application 940 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 940 can invoke the API calls 950 provided by the operating system 912 to facilitate functionalities described herein.

We claim:

1. A system for facilitating omnichannel customer interaction transfers, the system comprising:

a processor;

a database comprising a plurality of related tables for storing data records relating to omnichannel customer interactions, the plurality of related tables including at least an interactions table, a channels table, an invitations table, a participants table, and a topics table; and a memory storage device storing instructions thereon, which, when executed by the processor, cause the system to perform operations comprising:

establishing a first customer interaction session by:

receiving a first incoming connection request from a customer device via a messaging communication channel, the request including a customer identifier and a topic identifier;

generating a first interaction data record in the interactions table with an interaction identifier linked to the customer identifier and topic identifier;

generating a first channel data record in the channels table linked to the interaction identifier and identifying the messaging communication channel; and connecting the customer with a first agent via the messaging communication channel; and facilitating a transfer to a voice communication channel with a new agent by:

receiving a request to transfer the customer interaction to a voice communication channel with a second agent;

querying the interactions table using the customer identifier and topic identifier to identify the active interaction data record;

generating a second channel data record in the channels table linked to the same interaction identifier and identifying the voice communication channel;

generating an invitation data record in the invitations table linked to the interaction identifier for the second agent;

generating a participant data record in the participants table linking the second agent to the interaction identifier and voice channel;

providing the second agent with interaction context data retrieved from the linked data records in the interactions, channels, and participants tables associated with the interaction identifier; and establishing the voice communication session between the customer and the second agent while maintaining continuity of the customer interaction through the shared interaction identifier across both communication channels.

2. The system of claim 1, wherein the memory storage device stores additional instructions that, when executed by the processor, cause the system to perform additional operations comprising:

while the second agent and the customer are connected over the voice communication channel, receiving from a computing device of the second agent a request to add a third agent to the voice communication channel;

processing the request to add the third agent by:

generating a second invitation data record in the invitations table linked to the interaction identifier for the third agent;

generating a second participant data record in the participants table linking the third agent to the interaction identifier and voice communication channel; and providing the third agent with interaction context data retrieved from the linked data records associated with the interaction identifier; and establishing a voice communication session among the customer, the second agent, and the third agent while maintaining continuity of the customer interaction through the shared interaction identifier.

3. The system of claim 1, wherein the memory storage device stores additional instructions that, when executed by the processor, cause the system to perform additional operations comprising:

while the second agent and the customer are connected over the voice communication channel, receiving from a computing device of the second agent a request to establish a connection with the customer over a third communication channel different from both the messaging communication channel and the voice communication channel;

generating a third channel data record in the channels table linked to the interaction identifier and identifying the third communication channel; and establishing a communication session between the customer and the second agent over the third communication channel while maintaining continuity of the customer interaction through the shared interaction identifier across all active communication channels.

4. The system of claim 3, wherein the third communication channel is a video communication channel or an SMS communication channel.

5. The system of claim 1, wherein the memory storage device stores additional instructions that, when executed by the processor, cause the system to perform additional operations comprising:

while the second agent and the customer are connected over the voice communication channel, receiving a second incoming connection request from the customer device via a fourth communication channel of the plurality of communication channels, the second request including the customer identifier and topic identifier;

querying the interactions table using the customer identifier and topic identifier to confirm the active interaction data record;

generating a fourth channel data record in the channels table linked to the same interaction identifier and identifying the fourth communication channel;

generating a second invitation data record in the invitations table linked to the interaction identifier for the second agent or a different agent; and establishing a communication session over the fourth communication channel while maintaining continuity of the customer interaction through the shared interaction identifier across all active communication channels.

6. The system of claim 1, wherein:

the interactions table has a primary key field and a plurality of data fields including data fields for at least the interaction identifier, the topic identifier, the customer identifier, and a status;

the channels table has a primary key field and a plurality of data fields including data fields for at least a channel identifier, the interaction identifier, a channel type identifier, and a status, and one or more of the data fields of the channels table serves as a foreign key referencing one or more related data fields of the interactions table;

the invitations table has a primary key field and a plurality of data fields including data fields for at least an invitation identifier, the interaction identifier, a channel type identifier, and a status, and one or more of the data fields of the invitations table serves as a foreign key referencing one or more related data fields of the channels table;

the participants table has a primary key field and a plurality of data fields including data fields for at least a participant identifier, the interaction identifier, a channel identifier, a channel type identifier, an agent identifier, and a participant type, and one or more of the data fields of the participants table serves as a foreign key referencing one or more related data fields of the channels table; and the topics table has a primary key field and a plurality of data fields including data fields for at least the topic identifier, the interaction identifier, a status, a channel identifier, and an agent identifier, and one or more of the data fields of the topics table serves as a foreign key referencing one or more related data fields of the interactions table.

7. The system of claim 1, wherein providing the second agent with interaction context data comprises:

retrieving historical conversation data from prior communication sessions associated with the interaction identifier;

retrieving customer profile information linked to the customer identifier; and presenting the interaction context data via a user interface displaying a unified view of the customer interaction across multiple communication channels.

8. The system of claim 1, wherein the memory storage device stores additional instructions that, when executed by the processor, cause the system to perform additional operations comprising:

monitoring communication quality metrics for the voice communication channel; and automatically generating a recommendation to transfer the customer interaction to an alternative communication channel when the communication quality metrics fall below a predetermined threshold.

9. A computer-implemented method for facilitating omnichannel customer interaction transfers using a database comprising a plurality of related tables for storing data records relating to omnichannel customer interactions, the plurality of related tables including at least an interactions table, a channels table, an invitations table, a participants table, and a topics table, the method comprising:

establishing a first customer interaction session by:

receiving a first incoming connection request from a customer device via a messaging communication channel, the request including a customer identifier and a topic identifier;

generating a first interaction data record in the interactions table with an interaction identifier linked to the customer identifier and topic identifier;

generating a first channel data record in the channels table linked to the interaction identifier and identifying the messaging communication channel; and connecting the customer with a first agent via the messaging communication channel;

facilitating a transfer to a voice communication channel with a new agent by:

receiving a request to transfer the customer interaction to a voice communication channel with a second agent;

querying the interactions table using the customer identifier and topic identifier to identify the active interaction data record;

generating a second channel data record in the channels table linked to the same interaction identifier and identifying the voice communication channel;

generating an invitation data record in the invitations table linked to the interaction identifier for the second agent;

generating a participant data record in the participants table linking the second agent to the interaction identifier and voice channel;

providing the second agent with interaction context data retrieved from the linked data records in the interactions, channels, and participants tables associated with the interaction identifier; and establishing the voice communication session between the customer and the second agent while maintaining continuity of the customer interaction through the shared interaction identifier across both communication channels.

10. The computer-implemented method of claim 9, further comprising:

while the second agent and the customer are connected over the voice communication channel, receiving from a computing device of the second agent a request to add a third agent to the voice communication channel;

processing the request to add the third agent by:

generating a second invitation data record in the invitations table linked to the interaction identifier for the third agent;

generating a second participant data record in the participants table linking the third agent to the interaction identifier and voice communication channel; and providing the third agent with interaction context data retrieved from the linked data records associated with the interaction identifier; and establishing a voice communication session among the customer, the second agent, and the third agent while maintaining continuity of the customer interaction through the shared interaction identifier.

11. The computer-implemented method of claim 9, further comprising:

while the second agent and the customer are connected over the voice communication channel, receiving from a computing device of the second agent a request to establish a connection with the customer over a third communication channel different from both the messaging communication channel and the voice communication channel;

generating a third channel data record in the channels table linked to the interaction identifier and identifying the third communication channel; and establishing a communication session between the customer and the second agent over the third communication channel while maintaining continuity of the customer interaction through the shared interaction identifier across all active communication channels.

12. The computer-implemented method of claim 11, wherein the third communication channel is a video communication channel or an SMS communication channel.

13. The computer-implemented method of claim 9, wherein the memory storage device stores additional instructions that, when executed by the processor, cause the system to perform additional operations comprising:

while the second agent and the customer are connected over the voice communication channel, receiving a second incoming connection request from the customer device via a fourth communication channel of the plurality of communication channels, the second request including the customer identifier and topic identifier;

querying the interactions table using the customer identifier and topic identifier to confirm the active interaction data record;

generating a fourth channel data record in the channels table linked to the same interaction identifier and identifying the fourth communication channel;

generating a second invitation data record in the invitations table linked to the interaction identifier for the second agent or a different agent; and establishing a communication session over the fourth communication channel while maintaining continuity of the customer interaction through the shared interaction identifier across all active communication channels.

14. The computer-implemented method of claim 9, wherein:

the interactions table has a primary key field and a plurality of data fields including data fields for at least the interaction identifier, the topic identifier, the customer identifier, and a status;

the channels table has a primary key field and a plurality of data fields including data fields for at least a channel identifier, the interaction identifier, a channel type identifier, and a status, and one or more of the data fields of the channels table serves as a foreign key referencing one or more related data fields of the interactions table;

the invitations table has a primary key field and a plurality of data fields including data fields for at least an invitation identifier, the interaction identifier, a channel type identifier, and a status, and one or more of the data fields of the invitations table serves as a foreign key referencing one or more related data fields of the channels table;

the participants table has a primary key field and a plurality of data fields including data fields for at least a participant identifier, the interaction identifier, a channel identifier, a channel type identifier, an agent identifier, and a participant type, and one or more of the data fields of the participants table serves as a foreign key referencing one or more related data fields of the channels table; and the topics table has a primary key field and a plurality of data fields including data fields for at least the topic identifier, the interaction identifier, a status, a channel identifier, and an agent identifier, and one or more of the data fields of the topics table serves as a foreign key referencing one or more related data fields of the interactions table.

15. The computer-implemented method of claim 9, wherein providing the second agent with interaction context data comprises:

retrieving historical conversation data from prior communication sessions associated with the interaction identifier;

retrieving customer profile information linked to the customer identifier; and presenting the interaction context data via a user interface displaying a unified view of the customer interaction across multiple communication channels.

16. The computer-implemented method of claim 9, wherein the memory storage device stores additional instructions that, when executed by the processor, cause the system to perform additional operations comprising:

monitoring communication quality metrics for the voice communication channel; and automatically generating a recommendation to transfer the customer interaction to an alternative communication channel when the communication quality metrics fall below a predetermined threshold.

17. A system for facilitating omnichannel customer interaction transfers, the system comprising:

a database comprising a plurality of related tables for storing data records relating to omnichannel customer interactions, the plurality of related tables including at least an interactions table, a channels table, an invitations table, a participants table, and a topics table; and a memory storage device storing instructions thereon, which, when executed by the processor, cause the system to perform operations comprising:

means for establishing a first customer interaction session by:

receiving a first incoming connection request from a customer device via a messaging communication channel, the request including a customer identifier and a topic identifier;

generating a first interaction data record in the interactions table with an interaction identifier linked to the customer identifier and topic identifier;

generating a first channel data record in the channels table linked to the interaction identifier and identifying the messaging communication channel; and connecting the customer with a first agent via the messaging communication channel;

means for facilitating a transfer to a voice communication channel with a new agent by:

receiving a request to transfer the customer interaction to a voice communication channel with a second agent;

querying the interactions table using the customer identifier and topic identifier to identify the active interaction data record;

generating a second channel data record in the channels table linked to the same interaction identifier and identifying the voice communication channel;

generating an invitation data record in the invitations table linked to the interaction identifier for the second agent;

generating a participant data record in the participants table linking the second agent to the interaction identifier and voice channel;

providing the second agent with interaction context data retrieved from the linked data records in the interactions, channels, and participants tables associated with the interaction identifier; and establishing the voice communication session between the customer and the second agent while maintaining continuity of the customer interaction through the shared interaction identifier across both communication channels.

18. The system of claim 17, further comprising:

while the second agent and the customer are connected over the voice communication channel, means for receiving from a computing device of the second agent a request to add a third agent to the voice communication channel;

means for processing the request to add the third agent by:

generating a second invitation data record in the invitations table linked to the interaction identifier for the third agent;

generating a second participant data record in the participants table linking the third agent to the interaction identifier and voice communication channel; and providing the third agent with interaction context data retrieved from the linked data records associated with the interaction identifier; and establishing a voice communication session among the customer, the second agent, and the third agent while maintaining continuity of the customer interaction through the shared interaction identifier.

19. The system of claim 17, further comprising:

while the second agent and the customer are connected over the voice communication channel, means for receiving from a computing device of the second agent a request to establish a connection with the customer over a third communication channel different from both the messaging communication channel and the voice communication channel;

means for generating a third channel data record in the channels table linked to the interaction identifier and identifying the third communication channel; and means for establishing a communication session between the customer and the second agent over the third communication channel while maintaining continuity of the customer interaction through the shared interaction identifier across all active communication channels.

20. The system of claim 17, wherein the third communication channel is a video communication channel or an SMS communication channel.

* * * * *